(12) United States Patent
Pritts

(10) Patent No.: US 9,778,490 B2
(45) Date of Patent: Oct. 3, 2017

(54) THERAPEUTIC EYEWEAR

(75) Inventor: James E. Pritts, Emerald Hills, CA (US)

(73) Assignee: Spy Optic Inc., Carlsbad, CA (US)

( * ) Notice: Subject to any disclaimer, the term of this patent is extended or adjusted under 35 U.S.C. 154(b) by 287 days.

(21) Appl. No.: 13/551,341

(22) Filed: Jul. 17, 2012

(65) Prior Publication Data
US 2013/0114036 A1 May 9, 2013

Related U.S. Application Data

(60) Provisional application No. 61/556,081, filed on Nov. 4, 2011.

(51) Int. Cl.
*G02C 7/10* (2006.01)
*G02C 7/12* (2006.01)

(52) U.S. Cl.
CPC ............. *G02C 7/104* (2013.01); *G02C 7/10* (2013.01); *G02C 7/12* (2013.01)

(58) Field of Classification Search
CPC ............. G02C 7/10; G02C 7/12; G02C 7/104
USPC ........ 351/159.01, 159.6, 159.29, 159.66, 44, 351/47–49, 163
See application file for complete search history.

(56) References Cited

U.S. PATENT DOCUMENTS

| 4,698,374 | A | 10/1987 | Gallas |
| 5,036,115 | A | 7/1991 | Gallas et al. |
| 5,047,447 | A | 9/1991 | Gallas et al. |
| 5,112,883 | A | 5/1992 | Gallas et al. |
| 5,116,884 | A | 5/1992 | Gallas et al. |
| 5,149,183 | A | 9/1992 | Perrott et al. |
| 5,187,207 | A | 2/1993 | Gallas et al. |
| 5,274,403 | A | 12/1993 | Gott |
| 5,926,310 | A | 7/1999 | Tamura et al. |
| 6,078,429 | A | 6/2000 | Lyon et al. |
| 6,145,984 | A | 11/2000 | Farwig et al. |
| 6,334,680 | B1 | 1/2002 | Larson |
| 6,604,824 | B2 | 8/2003 | Larson |
| 6,641,261 | B2 * | 11/2003 | Wang et al. .................... 351/44 |
| 6,773,816 | B2 | 8/2004 | Tsutsumi |

(Continued)

FOREIGN PATENT DOCUMENTS

| CN | 1567028 A | 1/2005 |
| CN | 101652700 A | 2/2010 |

(Continued)

OTHER PUBLICATIONS

Sullivan, Andrew, "Feel-Good Glass", The Daily Beast, (www.thedailybeast.com), Jul. 16, 2012 (1 page).

(Continued)

*Primary Examiner* — Ricky Mack
*Assistant Examiner* — Daniele Manikeu
(74) *Attorney, Agent, or Firm* — Stetina Brunda Garred & Brucker

(57) ABSTRACT

The embodiments disclosed herein relate to a transparent material to provide protection to a person's eyes from harmful wavelengths of the light spectrum, overall visual comfort, or improved vision such as color enhancement, target recognition and other functions, while selectively transmitting more of certain wavelengths of the light spectrum that have a therapeutic benefit such as healing or general mood modifier. The transparent material may be a lens or a shield which is disposed in front of the wearer's eyes.

9 Claims, 5 Drawing Sheets

(56) References Cited

U.S. PATENT DOCUMENTS

| | | | |
|---|---|---|---|
| 6,825,975 B2 | 11/2004 | Gallas | |
| 6,893,127 B2* | 5/2005 | Reichow et al. | 351/159.63 |
| 6,984,038 B2 | 1/2006 | Ishak | |
| 7,029,118 B2 | 4/2006 | Ishak | |
| 7,029,758 B2 | 4/2006 | Gallas | |
| 7,066,596 B2 | 6/2006 | Ishak | |
| 7,255,435 B2* | 8/2007 | Pratt | 351/44 |
| 7,372,640 B2 | 5/2008 | Fung | |
| 7,393,100 B2 | 7/2008 | Mertz | |
| 7,506,977 B1 | 3/2009 | Aiiso | |
| 7,520,607 B2 | 4/2009 | Casper et al. | |
| 7,520,608 B2 | 4/2009 | Ishak et al. | |
| 7,597,441 B1 | 10/2009 | Farwig | |
| 7,748,845 B2 | 7/2010 | Casper et al. | |
| 7,841,714 B2* | 11/2010 | Gruber | 351/159.65 |
| 7,984,989 B2 | 7/2011 | Gruber | |
| 8,048,343 B2 | 11/2011 | Gallas et al. | |
| 8,113,651 B2 | 2/2012 | Blum et al. | |
| 8,133,414 B2 | 3/2012 | Gallas et al. | |
| 8,164,844 B2 | 4/2012 | Toda et al. | |
| 2002/0140901 A1 | 10/2002 | Reichow et al. | |
| 2005/0041299 A1 | 2/2005 | Gallas | |
| 2005/0230347 A1 | 10/2005 | Gallas et al. | |
| 2006/0033851 A1* | 2/2006 | Iori et al. | 349/14 |
| 2006/0092374 A1* | 5/2006 | Ishak | G02C 7/12 351/159.57 |
| 2006/0114573 A1 | 6/2006 | Iori et al. | |
| 2008/0065177 A1 | 3/2008 | Casper et al. | |
| 2009/0015786 A1* | 1/2009 | Harris | B29D 11/00317 351/159.64 |
| 2010/0066974 A1* | 3/2010 | Croft et al. | 351/163 |
| 2010/0118263 A1 | 5/2010 | Tamura et al. | |
| 2011/0090453 A1 | 4/2011 | Chen et al. | |
| 2011/0141432 A1* | 6/2011 | Nesty | 351/44 |
| 2011/0255051 A1* | 10/2011 | McCabe | G02C 7/104 351/159.6 |
| 2012/0075577 A1 | 3/2012 | Ishak et al. | |

FOREIGN PATENT DOCUMENTS

| | | |
|---|---|---|
| CN | 102124394 A | 7/2011 |
| EP | 1580590 | 9/2005 |
| EP | 1580591 A1 | 9/2005 |

OTHER PUBLICATIONS

Photo Protective Technologies, "Melanin Lenses May Provide Physical Therapy for the Eye", www.melaniniproducts.com/phototherapy (2 pages).

International Search Report and Written Opinion for International Application No. PCT/US2012/054254; 6 Pages.

\* cited by examiner

| Therapeutic Lens Transmittance Data | | |
|---|---|---|
| Wavelength | Dark Gray | Light Brown |
| 400 | 0.0% | 0.0% |
| 410 | 1.1% | 1.1% |
| 420 | 2.5% | 2.5% |
| 430 | 5.5% | 4.5% |
| 440 | 7.8% | 6.1% |
| 450 | 12.4% | 8.4% |
| 460 | 19.5% | 15.0% |
| 470 | 22.9% | 30.0% |
| 480 | 24.2% | 40.4% |
| 490 | 23.3% | 40.1% |
| 500 | 20.7% | 37.5% |
| 510 | 19.2% | 33.3% |
| 520 | 18.0% | 30.0% |
| 530 | 16.6% | 26.1% |
| 540 | 15.1% | 22.9% |
| 550 | 14.8% | 22.4% |
| 560 | 13.5% | 22.3% |
| 570 | 13.2% | 22.4% |
| 580 | 13.3% | 22.2% |
| 590 | 13.2% | 22.3% |
| 600 | 13.1% | 21.9% |
| 610 | 14.8% | 27.0% |
| 620 | 16.3% | 35.1% |
| 630 | 18.4% | 44.2% |
| 640 | 21.5% | 52.3% |
| 650 | 25.0% | 60.0% |
| 660 | 30.0% | 70.0% |
| 670 | 35.7% | 77.5% |
| 680 | 44.2% | 82.5% |
| 690 | 53.5% | 85.9% |
| 700 | 62.1% | 88.1% |
| 710 | 69.8% | 89.8% |
| 720 | 77.0% | 90.0% |
| 730 | 83.0% | 90.0% |
| 740 | 87.5% | 90.0% |
| 750 | 90.0% | 90.0% |
| 760 | 90.0% | 90.0% |
| 770 | 90.0% | 90.0% |
| 780 | 90.0% | 90.0% |
| 790 | 90.0% | 90.0% |
| 800 | 90.0% | 90.0% |

| Therapeutic Lens Transmittance Data | | |
|---|---|---|
| Wavelength | Dark Gray | Light Brown |
| 810 | 90.0% | 90.0% |
| 820 | 90.0% | 90.0% |
| 830 | 90.0% | 90.0% |
| 850 | 90.0% | 90.0% |
| 860 | 90.0% | 90.0% |
| 870 | 90.0% | 90.0% |
| 880 | 90.0% | 90.0% |
| 890 | 90.0% | 90.0% |
| 900 | 90.0% | 90.0% |

Fig. 5

THERAPEUTIC EYEWEAR

CROSS-REFERENCE TO RELATED APPLICATIONS

This application claims the benefits of Provisional Patent Application Ser. No. 61/556,081, filed on Nov. 4, 2011, the entire contents of which are expressly incorporated herein by reference.

STATEMENT RE: FEDERALLY SPONSORED RESEARCH/DEVELOPMENT

Not Applicable

BACKGROUND

The embodiments disclosed herein relate to eyewear that preserves natural therapeutic effects (i.e., possible physiological benefits) of sunlight while providing eye protection and visual performance and comfort.

Prior art eyewear has been designed to provide physical protection to the user and improve vision for a variety of uses. For example, ultra violet and shortwave blue/violet light can damage the eye. Protective lenses have been designed to block or significantly limit exposure to these parts of the light spectrum. Prior art eyewear has been designed with a variety of lens filtrations to reduce transmittance of these ranges of known harmful light through the lens of the eyewear, but may impair some of the natural therapeutic effects of sunlight. Prior art eyewear has also been developed to provide comfort and improved vision for sports, target recognition, color enhancement, driving, and computer viewing among other uses. Additionally, eyewear may also incorporate photo chromic and polarization lens treatments to reduce glare. Examples of prior art transmission curves for brown, green and neutral gray lenses are shown in FIGS. 1-3.

People have a circadian rhythm which defines a person's normal day/night body clock. Circadian rhythm is predominantly affected by light exposure. Hence, anything that affects exposure to light can potentially alter that person's normal day/night body clock. For example, the following can affect a person's exposure to light, namely, 1) being indoors without sufficient natural light levels during the day, 2) being exposed to too low of a range of sunlight, and 3) travel across multiple time zones. It can also be affected by wearing sunglasses.

A person's circadian rhythm can be visualized as a sinusoidal wave. There is a wavelength indicated by time between peak to peak or valley to valley. There is a phase which is indicated by the position of the peak or valley within a particular day/night time period. Also, there is an amplitude of the sinusoidal wave indicating the height or strength of the circadian rhythm. By modifying a person's exposure to light, the wavelength, phase and intensity of the person's circadian rhythm can be altered. For example, exposure to light in the evening can affect the phase of the circadian rhythm by delaying the onset of melatonin secretion (and sleep). Phase shift is the principle behind adapting to jet lag.

Accordingly, there is a need in the art for an improved eyewear.

SUMMARY

The embodiments disclosed herein address the needs discussed above, discussed below and those that are known in the art.

The embodiments disclosed herein relate to an eyewear which disposes a transparent material (e.g., lens or shield) in front of a person's eyes to provide protection and/or vision enhancement to the person. The eyewear may also selectively allow certain wavelengths of light through the transparent material to preserve the therapeutic benefits (i.e., possible physiological benefits) of sunlight to the person while enhancing the colors humans are predisposed to prefer. By way of example and not limitation, the spectrum of light in the wavelength range of 600 nm to 900 nm and/or 450 nm to 510 nm may be allowed to selectively pass through the transparent material in substantially larger amounts than other wavelength ranges. By way of example and not limitation, the average light transmittance for the range 450 nm to 510 nm should be 2 or more times greater than the average light transmittance for the range 400 nm to 450 nm and 20% or more than the average light transmittance for the range 500 nm to 600 nm. Additionally, the average light transmittance for the range 600 nm to 900 nm should be 5 or more times greater than the average light transmittance for the range 400 nm to 450 nm and 2 or more times greater than the average light transmittance for the range 500 nm to 600 nm. As used herein, "nm" refers to nanometer. The transparent material may have a particular light transmittance profile characteristic within those ranges (i.e., 450 nm-510 nm and/or 600 nm-900 nm).

More particularly, an eyewear is disclosed. The eyewear may comprise a lens or shield which selectively allows more of certain natural therapeutic wavelengths of light therethrough while substantially blocking harmful wavelengths of light. The average light transmittance of the lens or shield at a wavelength range of 450 nm to 510 nm may be substantially greater than (e.g., 2 or more times) an average light transmittance of the lens or shield at a wavelength range of 400 nm to 450 nm. Also, light transmittance may have a relative maximum at around 460 nm to 490 nm (preferably around 470 nm to 480 nm), centered within the range of 450 nm to 510 nm. Light transmittance through the lens or shield may increase beginning at or about 600 nm, reaching a level of 2 or more times the overall lens Tv between 650 nm to 850 nm.

Light transmittance may be substantially attenuated (e.g., more than 50%, preferably more than 65%) in the range of 510 nm-600 nm to achieve the desired overall visible Tv, with minimum transmittance at any wavelength within the range of 510 nm to 600 nm no less than 0.2 luminous transmittance (Tv).

An overall light transmittance value of the lens or shield may be 8% to 15% for use of the lens or shield in bright environments. An overall light transmittance value of the lens or shield may be 16% to 25% for use of the lens or shield in moderately lit environments. An overall light transmittance value of the lens or shield may be 25% to 50% for low light daytime outdoor environments

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a table of values for the transmittance curves shown in FIG. 4.

DETAILED DESCRIPTION

Figure 1:
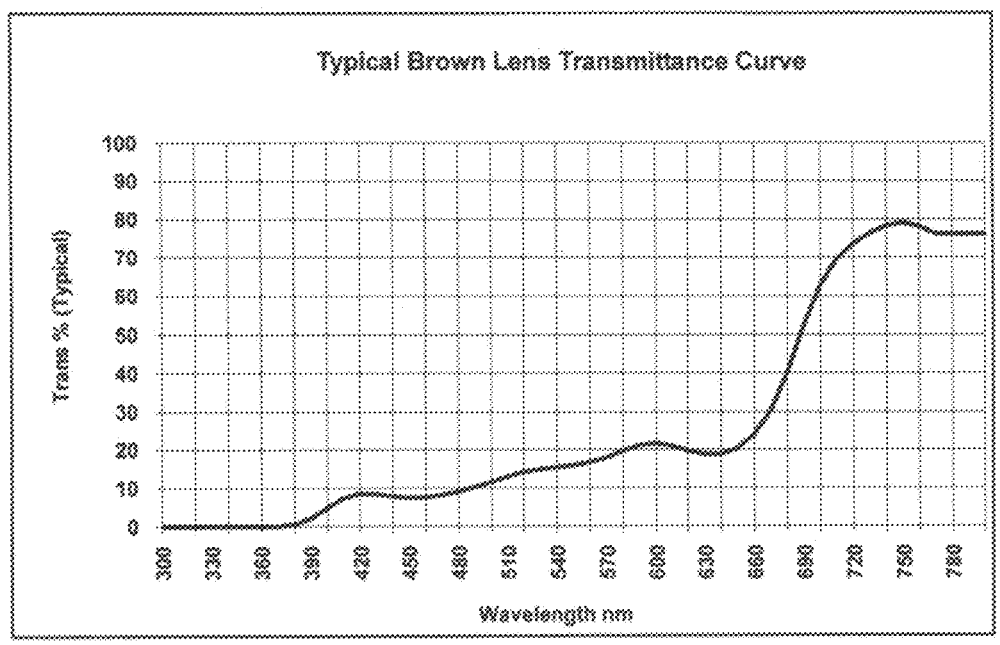
FIG. 1 illustrates an example of prior art transmittance curve for a brown lens.
Figure 2:
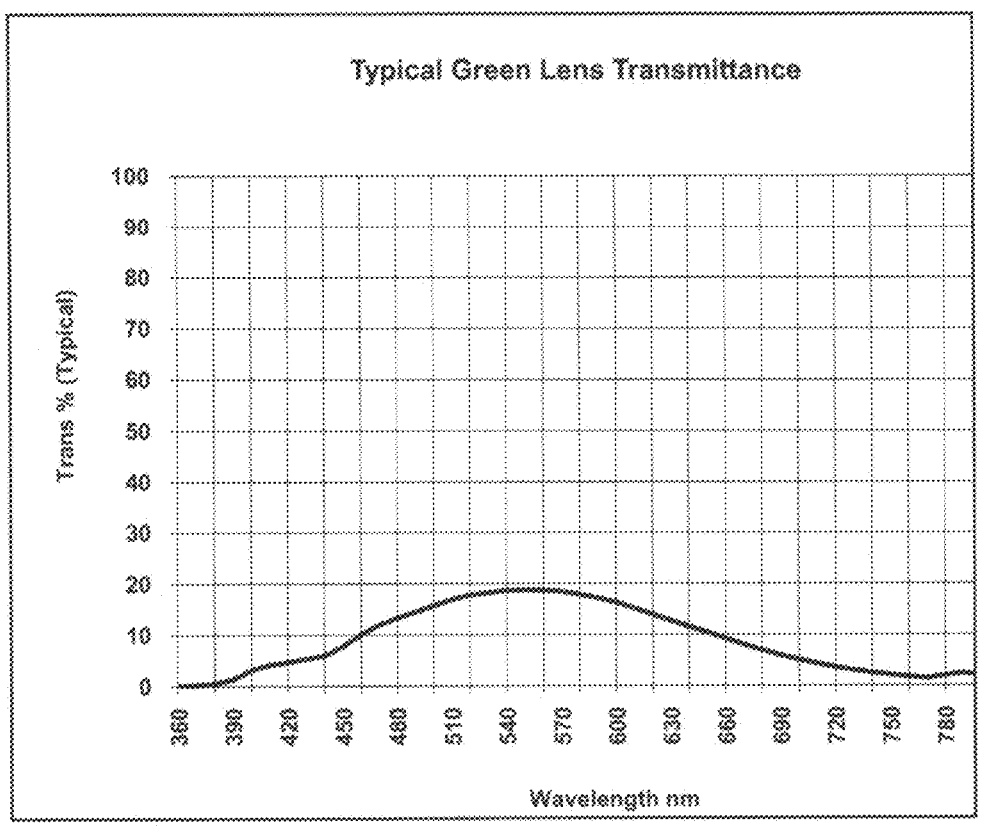
FIG. 2 illustrates an example of prior art transmittance curve for a green lens.
Figure 3:
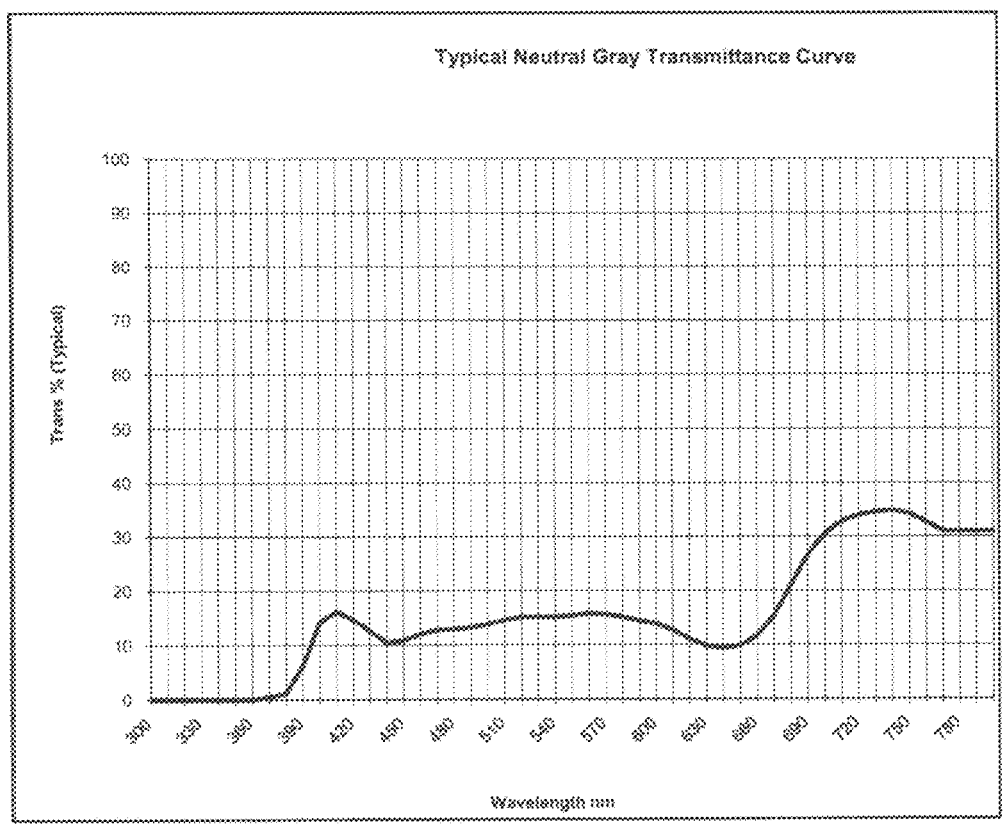
FIG. 3 illustrates an example of prior art transmittance curve for a neutral gray lens.

The embodiments of the lens or shields discussed herein relate to a corrective or a non corrective lens or shield which may be designed to selectively attenuate unwanted glare and harmful light and enhance vision while simultaneously enhancing transmittance of certain wavelengths of light for providing therapeutic benefits to the wearer.

In the embodiments disclosed herein, an eyewear with a lens or shield treated or formulated to provide a therapeutic effect to the wearer by allowing selective wavelength ranges of light to substantially transmit through the lens or shield. The eyewear may be a sunglass, goggle, visor or facemask or other device which provides a transparent material in front of the wearer's eyes. The eyewear may be worn about the wearer's head and held in place with left and right temples that wrap over the wearer's ears. The eyewear may be a face mask with a strap that encircles the wearer's head to secure the facemask to the wearer's head. The eyewear may be a goggle with a strap that secures the eyewear to the wearer's face. Regardless of the type of eyewear, the eyewear has one or more lens which is disposed in front of the wearer's eyes or one shield disposed in front of both eyes of the wearer.

The lens or shield may be fabricated from various materials known in the art or developed in the future. By way of example and not limitation, the lens or shield may be manufactured from a transparent material including but not limited to glass, polycarbonate, CR-39 (i.e., allyl diglycol carbonate), acrylic, polyurethane, nylon and triacetate. The lens or shield may have a curved configuration, a flat configuration, a combination of flat and curved configurations. Moreover, the lens or shield may be optically correct so as to mitigate distortion of objects viewed through the lens or shield. The lens or shield may be a non-corrective or a corrective lens or shield.

The lens or shield may have one or more treatments applied to the lens or shield to provide for a light transmittance profile of the lens or shield so that the treated lens or shield has a therapeutic effect while providing protection to the wearer's eyes. By way of example and not limitation, the treatment of the lens or shield may occur during processing of the lens or shield. Additives may be incorporated into the base material of the lens or shield in order to alter the transmittance profile of the lens or shield. Alternatively or additionally, the treatment of the lens or shield may include vapor deposition, dying the lens or shield, coating the exterior surface(s) of the lens or the shield, applying a film to the lens or the shield or any other process known in the art or developed in the future. Preferably, all such treatments should result in an aesthetically pleasing appearance or tint. Moreover, the treatment may also provide for enhancement of a particular color such as blue, orange, red, etc. as needed based on the environment in which the lens or shield is used.

Red and near-infrared wavelengths are able to pass through human tissue and have a beneficial effect on cells by stimulating the cells. This type of stimulation of the cells may immediately create more ATP (i.e., adenosine triphosphate) which has also been referred to as cellular energy and also increase DNA and RNA activity. These effects have been reported and appear to occur only in injured cells. The treated lens may provide for transmittance of light in the wavelength range of 600 nm to 900 nm, and more preferably provides for transmittance of light at least in the range of 610 nm to 850 nm. The lens or shield is treated so as to have a particular light transmittance profile as discussed herein to provide therapeutic benefits to the wearer.

The lens treatment may provide for an increasing amount of light transmittance within the 600 nm to 900 nm range and at least in the 610 nm to 850 nm range. By way of example and not limitation, the light transmittance at the lower limit (e.g., 600 nm or 610 nm) of the range may be lower compared to a peak transmittance within the range of 650 nm to 850 nm. By treating the lens or shield so as to have this characteristic and treating the lens to provide for other functions such as reduced glare, the eyewear may be useful for allowing the wearer to receive the therapeutic and healing benefit of being exposed to this range of light while taking advantage of the protection, comfort and/or other functions of the eyewear as discussed herein.

Additionally or alternatively, the lens or shield may be treated to have a greater light transmittance within the range of 450 nm-510 nm compared to the range of 400 nm to 450 nm. By way of example and not limitation, the average light transmittance within the range of 450 nm to 510 nm may be greater than the average light transmittance within the range of 400 nm-450 nm. Moreover, the light transmittance may have a relative maximum at 460-490 nm and preferably at 470-480 nm, centered within the range of 450 nm to 510 nm. By allowing more light to pass through the lens at this wavelength range which may be referred to as the long-wave blue spectrum, the wearer's circadian rhythm may be positively impacted. The wearer may feel more energetic and refreshed. They may also feel more enjoyment of outdoor colors people are predisposed to prefer such as blue skies. When exposed to this wavelength range of light, the wearer's daily sleep/wake rhythm may also be more generally in sync and the wearer's mood and health may be better overall.

The lens or shield may be treated to selectively allow light transmittance within the 600 nm-900 nm range as discussed above. Alternatively or additionally, the lens or shield may be treated to selectively allow light transmittance within the 450 nm-510 nm range as discussed herein. Accordingly, the lens or shield may be designed to selectively allow beneficial wavelengths of light to reach the wearer's eyes and facial tissue while providing protection, visual performance and/or comfort in common outdoor environments.

More particularly, in an embodiment of the lens or shield, the same may be designed by selecting base raw materials of the lens or shield and/or treating the lens to have the characteristics described herein. The lens or shield may block UV or substantially all (e.g., more than 96%, preferably more than 99%) wavelengths below about 400 nm.

In the wavelengths from 400 nm to 450 nm, the lens or shield may have a light transmittance value of 0% to 10%, preferably less than 5% average for that range. The wavelengths 400-450 nm are known as "high-energy visible" rays and have been shown to damage and age the skin. It is also implicated as a risk factor for age-related macular degeneration, the leading cause of blindness in people over fifty. The low transmission from 400 nm to 450 nm also aids in the contrast enhancement and clarity qualities of the lens. The lens or shield may allow an increased amount of light to pass through the lens at the 450 nm to 510 nm range. For example, the average light transmittance of the lens or shield at the 450 nm to 510 nm range may be greater than the average light transmittance of the lens or shield at the 400 nm to 450 nm range. Preferably, the light transmittance of the lens at the 450 nm wavelength may be 10% T or less (e.g., less than 5% T).

In the range of 450 nm to 510 nm, light transmittance of the lens or shield may have a relative maximum at around 460 nm to 490 nm (preferably at around 470-480 nm). The lens or shield may substantially attenuate light (e.g., more than 50%, preferably more than 65%) in the range of about 510 nm to 600 nm to achieve the desired overall visible Tv, with minimum transmittance in the range of 510 nm to 600 nm being no less than 0.2 luminous transmittance (Tv) so that the wearer is still able to distinguish the red, yellow and green colors of a traffic signal.

The lens or shield may allow for increasing light transmittance starting at about 600 nm and continuing through the red and near infrared light. Preferably, average light transmittance through the lens or shield in the range 650 nm to 850 nm will be 2 or more times the overall lens Tv.

The lens or shield may also be designed for an intended use or environment. For example, for bright environments, the lens may be manufactured to have a Tv 8-15%. For moderate light environments, the lens may be manufactured to have a Tv 16-25%. For low light environments and situations, the lens may be manufactured to have a Tv 25-50%.

The lens or shield may also be treated with other treatments such as polarization and/or photochromic treatments for reduction of undesireable glare and/or adaptability to changing light conditions. The lens or shield may also be treated with a coating for performance related purposes such as hydrophobic coatings, oliophobic coatings, extrahard coat, antifog coatings, anti-scratch coatings. Additionally or alternatively, aesthetic related coatings (e.g., mirror) may be treated on the lens or shield. The blue, green and red transmittance zones may be adjusted to achieve different lens colors that are for functional and/or cosmetic considerations so that the lens or shield may be perceived as copper, rose, brown, gray, green/gray or other colors. The lens or shield may also be enhanced by addition of multilayer dielectric antireflective coatings to improve overall lens/shield transmittance, reduce reflections and improve contrast. The lens or shield may also be enhanced to include dielectric mirror (non absorbing) coatings to achieve filtration or cosmetic objectives.

The color of the lens or shield may be defined by the transmittance profile discussed herein. Moreover, the color of the lens or shield may be designed to be aesthetically pleasing. Additionally, the color of the lens or shield and/or the transmittance profile may be selected to improve a visual experience of the wearer, improve identification of traffic signal colors, chromatic contrast and/or to positively modify a mood of the wearer and/or to facilitate repair of the wearer's skin and/or eye.

Figure 4:
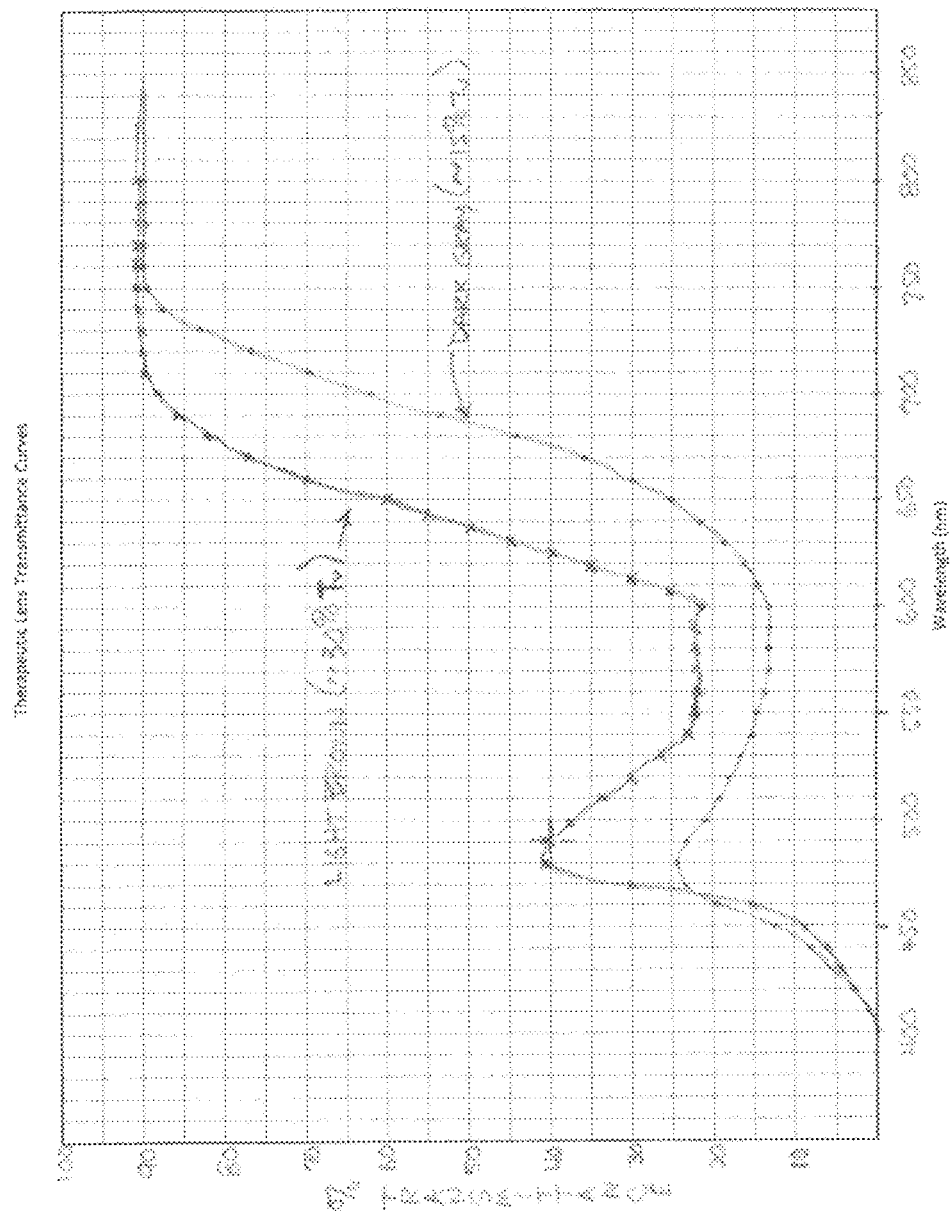
FIG. 4 illustrates transmittance curves for a dark gray tint and a light brown tint incorporating one or more various aspects discussed herein.

Referring now to FIG. 4, by way of example and not limitation, transmittance curves for the various embodiments disclosed herein are illustrated. For example, the curve for the dark gray tint may have an overall Tv of about 15%, whereas the curved for the light brown tint may have an overall Tv of about 30%. The lens may be treated or formulated to provide for other Tv values and tint colors. FIG. 5 illustrates the tabular data for the graphical representation shown in FIG. 4. More particularly, the transmittance curve illustrates a transmittance peak at around 480 nm within the range between 450 nm to 510 nm. Moreover, the transmittance curve begins to increase at about 600 nm to at least about 650 nm. In FIG. 4, the transmittance curve increases to about 750 nm.

The lens or shield may be designed to increase visual identification of objects and colors (e.g., traffic signal colors).

It is also contemplated that the various aspects discussed herein of the transmittance profile may be incorporated into other objects such as a window of a building or car. It may be incorporated into a front transparent plate of a television set, computer screen, video monitor.

The above description is given by way of example, and not limitation. Given the above disclosure, one skilled in the art could devise variations that are within the scope and spirit of the invention disclosed herein, including various ways of treating or formulating the lens or shield. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An eyewear for providing therapeutic effects while being worn in sunlight, the eyewear comprising:
    a lens which allows two ranges of therapeutic wavelengths of light therethrough;
    wherein an average light transmittance of the lens at the wavelength range of 460 nm to 510 nm is 3 or more times the average light transmittance of the lens at the wavelength range of 400 nm to 450 nm for therapeutically affecting a wearer's circadian rhythm;
    wherein the average light transmittance of the lens for the range of 460-510 nm is 30% or more than an average light transmittance for the range of 520 nm-560 nm, a maximum light transmittance within the range of 460 nm to 510 nm being at 470 nm to 495 nm to facilitate transmittance of a therapeutic portion of the blue light through the lens and a minimum light transmittance within the range of 540 nm to 600 nm being no less than 0.2 luminous transmittance, light transmittance of the lens starts to increase at or below 600 nm to facilitate transmittance of a full spectrum of red light through the lens, and an average light transmittance for the range between 650 nm to 850 nm is 2 or more times an average overall light transmittance of the lens for perceptively darkening a scene viewed through the lens and stimulating cells of the wearer with red and near-infrared wavelengths of light.

2. An eyewear for providing therapeutic effects while being worn in sunlight, the eyewear comprising:
    a lens which allows two ranges of therapeutic wavelengths of light therethrough;
    wherein an average light transmittance of the lens at the wavelength range of 450 nm to 510 nm is 2 or more times the average light transmittance of the lens at the wavelength range of 400 nm to 450 nm to facilitate transmittance of a therapeutic portion of the blue light through the lens for therapeutically affecting a wearer's circadian rhythm, light transmittance through the lens starts to increase at or below 600 nm to facilitate transmittance of a full spectrum of red light through the lens, and an average light transmittance in the range of 650 nm to 850 nm is about 2 or more times an average overall lens percent transmittance for perceptively darkening a scene viewed through the lens and stimulating cells with red and near-infrared wavelengths of light.

3. The eyewear of claim 1 wherein the lens blocks substantially all wavelengths below 400 nm.

4. The eyewear of claim 3 wherein light transmittance through the lens increases as the wavelength increases from 400 nm to 450 nm.

5. The eyewear of claim 1 wherein an overall luminous transmittance value of the lens is 8% to 15%.

6. The eyewear of claim 1 wherein an overall luminous transmittance value of the lens is 16% to 25%.

7. The eyewear of claim 1 wherein an overall luminous transmittance value of the lens is 25% to 50%.

8. An eyewear for providing therapeutic effects while being worn in sunlight, the eyewear comprising:
   a lens which allows two ranges of therapeutic wavelengths of light therethrough;
   wherein an average light transmittance of the lens at the wavelength range of 450 nm to 510 nm is 2 or more times the average light transmittance of the lens at the wavelength range of 400 nm to 450 nm to facilitate transmittance of a therapeutic portion of the blue light through the lens for therapeutically affecting a wearer's circadian rhythm;
   wherein the average light transmittance of the lens for the range of 450-50 nm is 20% or more than an average light transmittance for the range of 520 nm-580 nm, a maximum light transmittance within the range of 450 nm to 510 nm being at 460 nm to 510 nm and a minimum light transmittance within the range of 500 nm to 600 nm being no less than 0.2 luminous transmittance, light transmittance of the lens starts to increase at or below 600 nm to facilitate transmittance of a full spectrum of red light through the lens, and an average light transmittance for the range between 650 nm to 850 nm is 2 or more times an average overall light transmittance of the lens for perceptively darkening a scene viewed through the lens and stimulating cells with red and near-infrared wavelengths of light.

9. An eyewear for providing therapeutic effects while being worn in sunlight, the eyewear comprising:
   a lens which allows two ranges of therapeutic wavelengths of light therethrough;
   wherein an average light transmittance of the lens at a wavelength range of 450 nm to 510 nm is 2 or more times the average light transmittance of the lens at a wavelength range of 400 nm to 450 nm to facilitate transmittance of a therapeutic portion of the blue light through the lens for therapeutically affecting a wearer's circadian rhythm;
   wherein the light transmittance of the lens at 450-510 nm is 20% or more than an average light transmittance for the range of 500 nm-600 nm, the light transmittance has a relative maximum at 470 nm to 480 nm within the range of 450 nm to 510 nm, the light transmittance is substantially attenuated in the range of 510 nm-600 nm with a minimum transmittance within the range of 510 nm to 600 nm no less than 0.2 luminous transmittance, and light transmittance through the lens starts to increase at or below 600 nm to facilitate transmittance of a full spectrum of red light through the lens and an average light transmittance for the range between 650 nm to 850 nm is 2 or more times an average overall light transmittance of the lens for perceptively darkening the scene viewed through the lens and stimulating cells with red and near-infrared wavelengths of light.

* * * * *